Jan. 3, 1956  R. C. SCHENCK  2,729,420
VALVE FOR CORROSIVE FLUIDS
Filed July 29, 1950  3 Sheets-Sheet 1
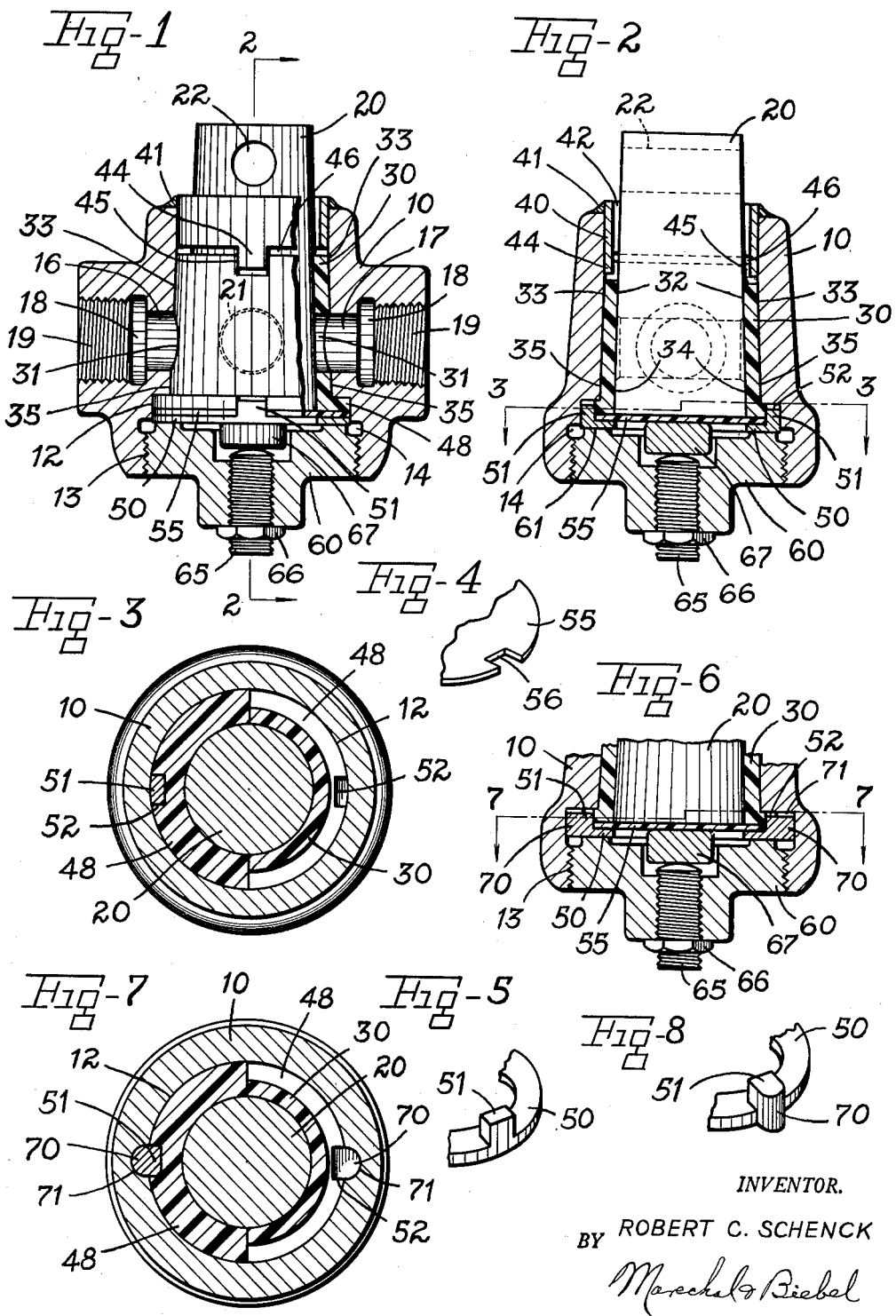
INVENTOR.
BY ROBERT C. SCHENCK
Marechal & Biebel
ATTORNEYS

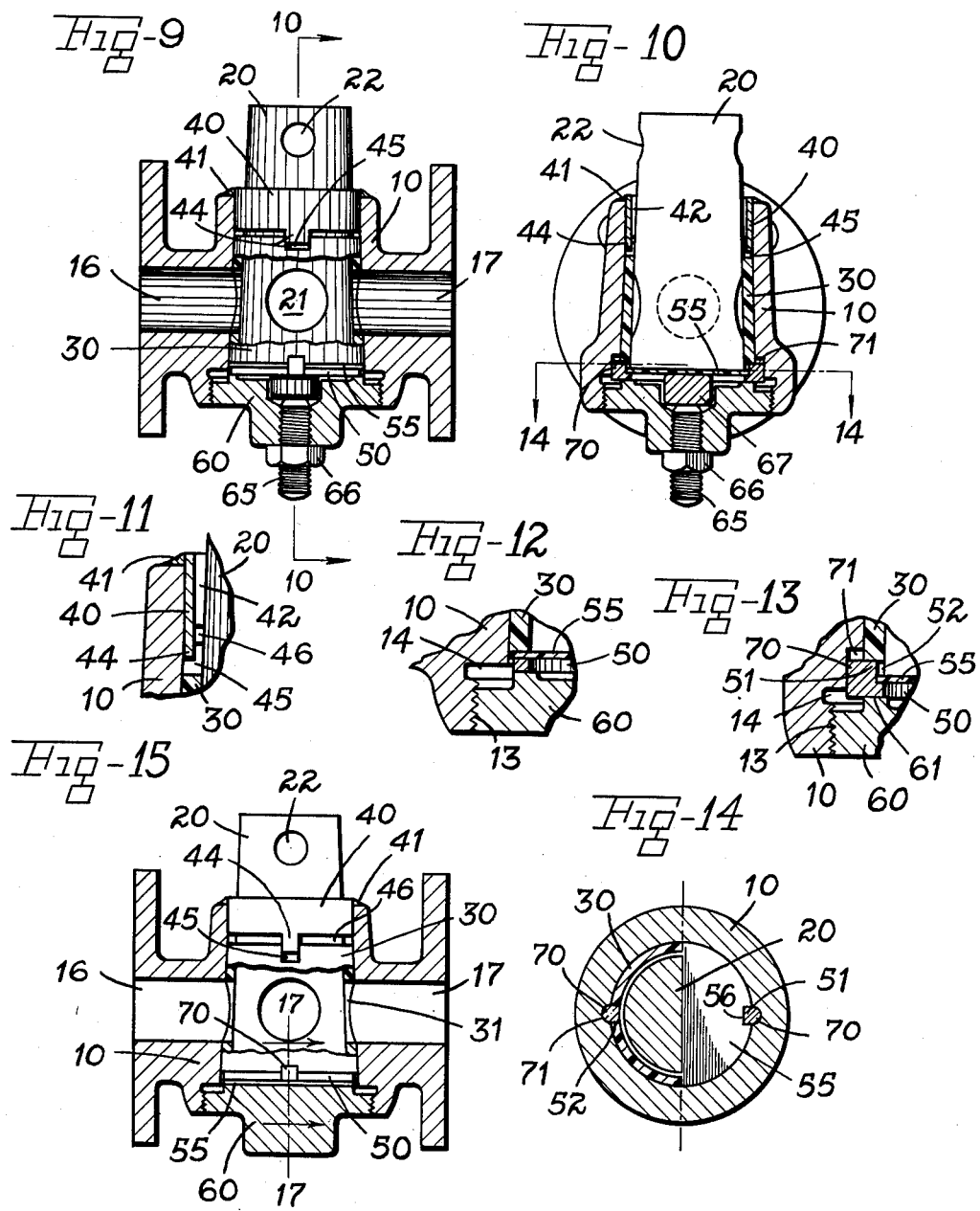

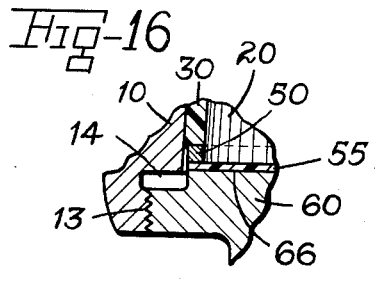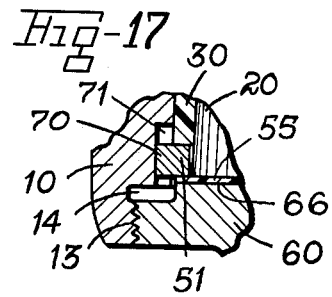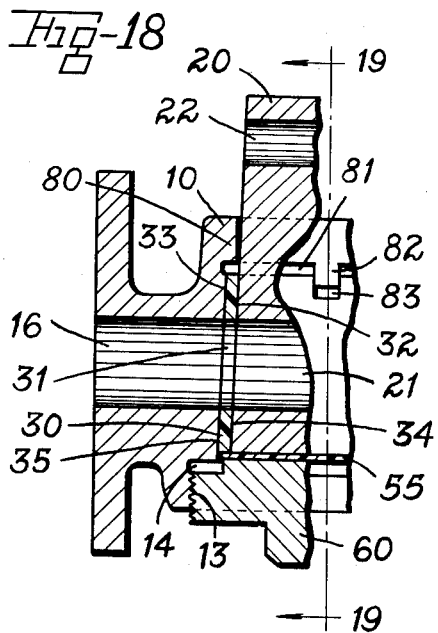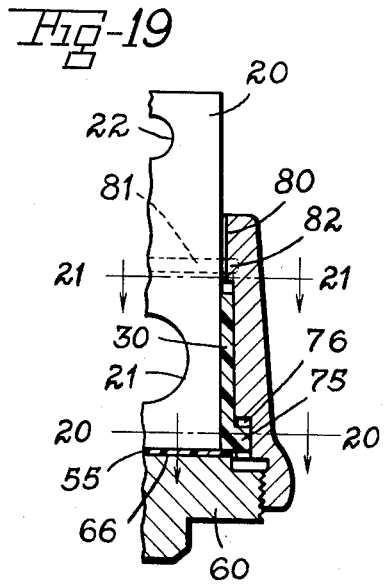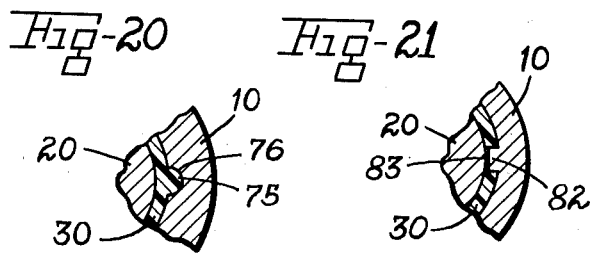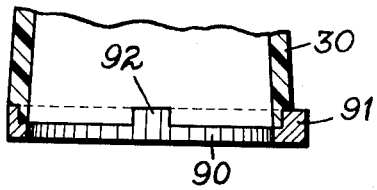
INVENTOR.
BY ROBERT C. SCHENCK
ATTORNEYS United States Patent Office 2,729,420
Patented Jan. 3, 1956

2,729,420

VALVE FOR CORROSIVE FLUIDS

Robert C. Schenck, Dayton, Ohio, assignor to The Duriron Company, Inc., Dayton, Ohio, a corporation of New York Application July 29, 1950, Serial No. 176,600

5 Claims. (Cl. 251—171)

This invention relates to plug valves and particularly to valves adapted to control the flow of corrosive fluids and the like and in which a molded plastic liner is utilized which is highly resistant to corrosion, which has good self-lubricating properties and which remains free turning in the absence of lubricant. Where the material of which such a liner is made has a different temperature coefficient of expansion from that of the remaining parts of the valve, such as the body and the plug, the subjecting of the valve to wide temperature variations may produce a serious tendency for the liner to adhere to the plug and to be turned relative to the body in response to the turning of the plug. Not only is this objectionable from the standpoint of partially obstructing the ports, but it may allow seepage of the fluid to occur either circumferentially or axially of the liner, resulting in a leaky and unsatisfactory condition.

It is important to provide for effectively sealing the liner both internally with respect to the plug, and externally with respect to the body, not only when the valve is closed but likewise when the valve is open.

It is also important to maintain proper closeness of fit under continued use, and to accomplish these results it has been found desirable to utilize a tapered plug and body receiving between them a liner of molded plastic composition having the desired low friction and self-lubricating properties, and also capable of a limited amount of free flow under pressure. However the presence of ribs or recesses on the sealing areas of the liner interferes with maintaining uniform sealing pressure relations throughout the circumference thereof and consequently it has been found desirable to avoid such non-uniform cross sections, and in the sealing areas immediately adjacent and on opposite sides of the port and flow passages, to provide circumferentially continuous sealing areas the cross section of which is substantially uniform throughout the circumference. This area being of substantially uniform thickness in a radial direction is so formed that when pressure is applied to the plug it will seat uniformly in the liner applying a substantially uniform pressure to the liner to retain the latter also substantially uniformly in sealing engagement with the bore in the body. Under the application of a proper degree of pressure the material of the liner will undergo cold flow to effect minor redistribution of its material as may be necessary to fill up the entire bore and thus prevent seepage between the liner and the body as well as avoiding any trapping of the fluid internally of the liner when the plug is turned to "off" position. There are however no marked variations in section such as would be the case with a continuous rib or recess extending into the sealing forming area, and which would interfere with the ability to establish and maintain such uniform pressure sealing conditions. The possibility of leakage occurring on either side of the liner along circumferentially discontinuous surfaces where uniform sealing pressure cannot be maintained is thus effectively avoided.

To keep the liner properly oriented and to prevent the possibility of its turning with the plug even under wide temperature variations, the liner is interlocked on both ends, outwardly of the respective sealing areas, so that it will be held at both ends against turning with respect to the body. Such interlocking may incorporate interengaging parts directly interfitting between the liner and the body, or the liner may interlock directly with a ring, the ring being held in non-rotating relation with the body either by frictional contact or by direct interfitting engagement. In each case however the liner is securely held in proper orientation circumferentially while allowing some axial movement as pressure is applied thereto to compensate for wear and to maintain proper sealing pressure relationships, neither end of the liner being allowed to twist or creep relative to the other. The non-uniform sections of the liner which form the interlocking parts being located outwardly of the sealing areas which are adjacent the flow passages, the seal effectively established thereby is not impaired, and thus a highly effective sealing is maintained, the valve is free-turning and self-lubricating, and can readily be adjusted at all times to take up for wear.

It is accordingly the principal object of the invention to provide a tapered plug valve, particularly for corrosion resisting purposes, which incorporates a plastic liner material of low friction, self-lubricating material, the liner having highly effective sealing areas on opposite sides of the flow passages and being additionally interlocked at both ends to prevent rotation in the body or twisting at either end.

It is also an object to provide such a valve making use of a liner which is preformed as by molding to substantially the shape desired and which has properties of cold flow so that upon application of pressure when in place in the valve it will deform in minor degree as necessary to produce a highly effective seal.

Other objects and advantages will be apparent from the following description, the accompanying drawings and the appended claims.

In the drawings—

Fig. 1 is a sectional view through a valve constructed in accordance with the present invention, the liner being shown primarily in elevation with a part broken away and sectioned;

Fig. 2 is a vertical sectional view on the line 2—2 of Fig. 1;

Fig. 3 is a horizontal sectional view on the broken line 3—3 of Fig. 2;

Fig. 4 is a partial perspective view of the thrust diaphragm;

Fig. 5 is a partial perspective view showing the locking ring;

Fig. 6 is a broken sectional view showing a modified form;

Fig. 7 is a horizontal sectional view on the broken line 7—7 of Fig. 6;

Fig. 8 is a partial perspective view showing the modified form of the locking ring;

Fig. 9 is a vertical sectional view showing a further modified form;

Fig. 10 is a vertical sectional view on the line 10—10 of Fig. 9;

Fig. 11 is a detail view on an enlarged scale showing the interlocking construction at the upper or small diameter end of the liner;

Figs. 12 and 13 are detailed section views showing the construction of the interlocking ring, thrust diaphragm and liner in two different circumferential positions;

Fig. 14 is a horizontal sectional view on the broken line 14—14 of Fig. 10;

Fig. 15 is a sectional view of an additional modified form;

Figs. 16 and 17 are views corresponding to Figs. 12 and 13 showing the construction of this additional modification of the interlocking construction for the liner;

Fig. 18 is a broken sectional view of a still further modification;

Fig. 19 is a vertical sectional view on the line 19—19 of Fig. 18;

Figs. 20 and 21 are horizontal sectional views on the lines 20—20 and 21—21 respectively of Fig. 19; and Fig. 22 is a partial sectional view showing a composite structure including a liner and locking ring mounted together.

Referring to the drawings which disclose preferred embodiments of the invention, the valve body is shown generally at 10 having a transverse tapered bore 11 therein, the bore having an enlarged recess portion 12 at one end, and having an internally threaded portion 13 extending into a relief 14. The body is also suitably formed with at least two flow passages 16, 17, each of which extends into an enlargement 18, and threaded parts 19 adapted to receive a pipe connection in the usual manner.

The plug is shown generally at 20, having a continuously tapered outer surface, and having a port 21 which is adapted to be aligned with the flow passages 16, 17 in order to control the flow of fluid through the valve. An additional opening 22 is preferably formed in the plug, in alignment with the port 21, but accessible outside the body, providing for receiving an operating pin or the like and affording an indication at all times of the actual setting of the valve. The entire surface of the plug is therefore smooth and continuous and can be readily finished by simple machining operations, the openings of port 21 being preferably chamfered on both sides of the plug.

A liner 30 of molded plastic material is utilized for establishing a sealed relation on its outer surface with the inner wall of the body, and on its inner surface with the exterior of the plug. The liner has the same arrangement of flow passages 31 therethrough to correspond with the flow passages 16, 17 of the body. In a valve adapted for the handling of corrosive fluids and the like it is particularly desirable that the liner be selected of such characteristics that the plug will be free turning in the absence of lubricant, and likewise capable of limited cold flow so that it can be pressed into close and effective sealing engagement as above described, both initially, and throughout its use as wear occurs.

A preferred material for this purpose is a polyethylene resin material, particularly the halogen substitution products thereof. In this group are included polyethylene itself, and $C_2Cl_4$, $C_2ClF_3$ and $C_2F_4$. The latter product, namely polytetrafluoroethylene and its interpolymers and copolymers is commercially available under the name of Teflon, and has been found especially desirable for use in accordance with the present invention, having the combination of the desired characteristics, namely, complete inertness in the presence of corrosive fluids including solvents, good self-lubricating properties, low frictional drag in contact with the corrosion resistant metals, toughness and resistance to physical wear, abrasion and the like, usable over a wide temperature range, and ability to be worked and capable of cold flow under pressure in order to establish highly effective sealing conditions. Such Teflon material has the property of cold flow, beginning in the range of pressures of about 1200 to 1500 pounds per square inch, having an attained deformation of from 4 to 8% at a pressure of 1200 pounds per square inch, such percentage increasing up to substantially continuous flow at pressures above about 1500 pounds per square inch.

Cross reference is made to copending application Serial No. 146,645, filed February 28, 1950, now Patent No. 2,713,987, describing a similar corrosion resisting valve construction.

In the form of the valve shown in Figs. 1 through 5, the liner 30 is formed with circumferentially continuous inner and outer sealing areas 32, 33 above the ports 16, 17, and similarly shaped inner and outer sealing areas 34, 35 below, or on the large diameter side of the ports. It will be noted that in these sealing areas immediately adjacent and outwardly of the flow passages, the cross section of the liner throughout its entire circumference is substantially uniform, and there is no sharp change in section such as would be occasioned by the presence of either ribs or recesses in this area. These areas of uniform and continuous character immediately adjacent the flow passages in contact with correspondingly continuous areas of the plug and body establish and maintain the completely sealed characteristics of the valve, both with regard to the area between the liner and the body, and the areas between the liner and the plug.

In order properly to retain the liner in predetermined orientation with the body, preventing any rotational misalignment between its flow passage 31 and flow passages 16, 17 of the body, interlocking or interengaging members are provided for interfitting with both ends of the liner, outwardly of the sealing areas thereof, thereby preventing such rotation, as well as the twisting of either end of the liner relative to the other. Referring first to the upper or small diameter end, as shown in Figs. 1 and 2, a sleeve 40 is secured in the upper end of the body by suitable means such as welding 41, the sleeve having clearance 42 with the plug and being provided with one or more prongs or projections 44 which extend downwardly toward the liner. The end of the liner is notched as shown at 45 in a pattern corresponding to the projections, the liner preferably terminating somewhat short of the sleeve leaving a clearance 46 to allow for further inward pressing of the liner as required to take up for wear during use. The projections 44 and the corresponding notches 45 may be of such size and number as to afford an adequate interengagement with the liner, thus firmly and securely holding the liner against rotation with respect to the body at its upper end, while at the same time allowing some clearance in the axial direction for adjustment. This clearance is also desirable to provide space for thermal expansion of the liner when the material of the liner has a higher temperature coefficient of expansion than the material of the body and plug as noted above.

At its lower or large diameter end the liner is formed with an outwardly projecting flange 48 which is received within a recess 12 of the body. In order to secure this end of the liner against turning, ring 50 (Fig. 5) is provided, the ring being of annular shape and having tangs or projections 51 extending in axial direction therefrom. The flange 48 of the liner is notched as shown at 52 in the areas corresponding with the tangs 51 and thus when in the assembled position shown in Figs. 1 and 2, it is evident that the ring 50 is directly interlocked and interfitted with the lower or large diameter end of the liner.

As pointed out in my above noted application, in the assembly of this valve, the liner 30 is preformed to the approximate size and shape for being received in the bore of the valve body. Pressure is then applied to the large end of the liner to press it into the body to the axial extent permitted by seating of the flange 48 on the outer end of the bore. The plug 20 is then inserted and pressure applied thereto forcing it into the liner to its proper position where the ports are substantially in alignment. This requires substantial pressure, and because of the relatively small taper a considerable pressure is developed upon the liner itself. This application of pressure to the liner is such as to result in a limited amount of cold flow thereof, producing a deformation of the liner material to such an extent as to cause it to shape itself accurately to the bore in the body, and at the same time to develop a smooth tapered surface which establishes sealing relationship on the surface of the plug on both the larger and smaller diameter sides of the flow passage and port.

A thrust diaphragm and sealing member 55 is shown as received between the ring 50 and the flange 48 of the liner, this diaphragm being provided with notches 56 (Fig. 4) which likewise interfit with the tangs 51 of the ring and thus hold the diaphragm against rotation while at the same time providing a positive seal against leakage into the valve beyond the liner.

The ring is shown as being held in the assembled position within the body by means of a cap 60 threaded into the threads 13 of the body. The cap has a land 61 in position to bear against the ring, and may be tightened as desired to establish and maintain a proper sealing pressure against the ring, the thrust diaphragm 55, and the outer flange 48 of the liner.

The frictional contact between the land 61 and ring 50 when the cap is properly tightened in place serves to prevent relative rotation between the ring and the body, and hence between the lower end of the liner and the body. In order to provide for separate adjustment of the pressure on the plug, the cap 60 carries an adjustable stud 65 which may be set by lock nut 66 and which bears against a thrust disk 67, the latter having direct contact with the thrust diaphragm 55 and through it with the plug 20. In this way the pressure on the plug can be applied separately from the adjustment of the cap 60.

It will be understood from the above that while the flanged portion 48 at the large end of the liner, and the notched portion 45 at the small end of the liner interrupt the smooth and uniform cross-sectional characteristic, this is not objectionable because of the effective sealing areas inwardly of these parts, which are such as to establish the seal on both sides of the liner and thus prevent either leakage through the valve, or leakage internally or externally along the plug or body, as well as avoiding the trapping of fluid internally of the liner when the valve is in "off" position.

Referring to Figs. 6, 7 and 8, the parts similarly numbered are the same as those described above, the difference being that the ring 50 is provided with a projection 70 which extends both radially outward so as to be received within recess 71 of the body, and axially at 51 to interengage with the slot 52 of the liner in the manner described in the previous form. Accordingly with this arrangement not only is the lower or large diameter end of the liner keyed or interlocked with the ring, but in addition the ring is directly interlocked with the body through the outwardly extending projection 70, and thus the liner is securely retained against turning even in the absence of the cap 60, and during the time that the cap is being tightened or removed.

Referring now to the construction shown in Figs. 9 through 14, the ring 40 at the upper end of the liner is shown of cylindrical shape, the adjacent inner bore of the body 10 being faced off to a cylindrical shape to receive the ring 40 therein. This simplifies the construction and insertion of the ring into the position within the body.

Also as shown in this form the liner 30 does not embody the outwardly extending flange 48 at its large diameter end and hence may be moved to a greater extent in an axial direction through the tightening action of cap 60, greater clearance around the prong 44 and notch 45 being accordingly allowed in this arrangement for adjustment.

As shown in Figs. 10, 13 and 14, the ring 50 is provided with the projections 70 which extend both axially to engage notches 52 in the end of the liner, and which likewise extend radially outward to be received in recesses 71 in the body, thus directly keying the large diameter end of the liner into the body, preventing rotation thereof.

In the form shown in Figs. 15 through 17 the separate thrust disk 67 and the adjusting stud 65 have been eliminated and pressure is applied by the tightening of cap 60 directly against the thrust diaphragm 55, which in turn bears against the ring 50. The ring has the projection 70 (Fig. 17) which keys into both the large diameter end of the liner and into the recess 71 of the body 10.

In the forms shown in Figs. 18 through 21, the ring 50 is eliminated, the cap 60 being tightened against the thrust diaphragm 55 which engages an outwardly extending projection 75 on the liner 30, such projection being of the shape shown in Fig. 20, and being received in a corresponding groove or recess 76 in the body 10. A number of such interfitting projections and recesses are provided around the circumference, such interfitting parts thus directly interlocking the large diameter end of the liner with the body.

At its smaller diameter end, in this form, the body is provided with an inwardly projecting portion 80 having clearance 81 around the plug and with radially inwardly extending parts 82 which enter notches 83 formed in the upper or small diameter end of the liner. This pattern of projections is suitably formed by casting or otherwise in the initial formation of the body and is properly correlated with the recesses 76 at the opposite end so that when the liner is inserted, the parts are properly interengaged at both the small and large diameter ends thereof.

Fig. 22 is a detailed view of a still further modification in which the liner 30 has no flange and is integrally formed with a locking ring 90 of metal or the like such as by molding having a series of outward projections 91 thereon adapted to be interfitted with corresponding recesses in the body. Such device may be formed by investment molding, the two parts being interflanged as shown, and represents a simple and inexpensive type of construction satisfactory for use in the present invention. The ring is shown as keyed into the end of the liner by means of one or more tangs 92 to prevent relative rotation therebetween.

The invention therefore provides a plug valve construction incorporating a plastic liner which is constructed for complete sealing relation above and below the flow passages in the body, both internally against the plug and externally against the body. The liner is effectively held at either end by parts which interengage and prevent rotation relative to the body, such parts however not impairing the uniform characteristics of the liner in the sealing areas.

While the forms of apparatus herein described constitute preferred embodiments of the invention, it is to be understood that the invention is not limited to these precise forms of apparatus, and that changes may be made therein without departing from the scope of the invention which is defined in the appended claims.

What is claimed is:

1. A lined plug valve comprising a valve body having flow passages and a frustoconical bore therethrough, a tapered plug received within said bore and having a port adapted to be aligned with said flow passages to control the flow through said valve, said plug being proportioned for annular clearance in said bore in the axially aligned position of said port with said flow passages, an annular liner received in said clearance and having flow passages therethrough corresponding with those in said body, said liner being formed of plastic material subject to deformation under pressure and having circumferentially continuous areas of substantial axial extent on both sides of said flow passages for establishing a sealing relation with corresponding circumferentially continuous areas on said plug and in said bore respectively, said liner being press-fitted into said bore under pressure causing cold flow thereof into sealing relation with the wall of said bore, means on said body extending into said clearance in interlocking relation with said smaller end of said liner beyond the adjacent said sealing area thereof to secure said end of said liner against angular movement in said bore, means for exerting pressure on the larger end of said plug to maintain said liner in deformed sealing relation with said plug and said bore, and said liner and said body being proportioned initially with respect to the axial length of said bore and the location therein of said interlocking means to provide annular space for accommodating the entire smaller annular terminal edge of said liner and including the portion of said edge directly opposed to said interlocking means upon deformation of said liner under the operation of said pressure exerting means and in response to applied sealing pressure in use.

2. A lined plug valve comprising a valve body having flow passages and a frustoconical bore therethrough, a tapered plug received within said bore and having a port adapted to be aligned with said flow passages to control the flow through said valve, said plug being proportioned for annular clearance in said bore in the axially aligned position of said port with said flow passages, an annular liner received in said clearance and having flow passages therethrough corresponding with those in said body, said liner being formed of plastic material subject to deformation under pressure and having circumferentially continuous areas of substantial axial extent on both sides of said flow passages for establishing a sealing relation with corresponding circumferentially continuous areas on said plug and in said bore respectively, the larger end of said liner having a circumferential flange thereon seating on said body to limit axial movement of said end of said liner into said bore, means on said body extending into said clearance in interlocking relation with the smaller end of said liner beyond the adjacent said sealing area thereof to secure said smaller end of said liner against angular movement in said bore, means for exerting pressure on the larger end of said plug to maintain said liner in said sealed relation with said plug and said bore, and said liner being proportioned axially with respect to the length of said bore and the location of said interlocking means to establish an annular space opposite the entire smaller annular terminal edge of said liner for receiving the material of said liner upon deformation thereof under the pressure of said pressure exerting means.

3. A lined plug valve comprising a valve body having a tapered bore and flow passages therethrough, said bore being substantially uniformly frustoconical and free of ribs and grooves on the surface thereof, a tapered plug received within said bore and having a port adapted to be aligned with said flow passages to control the flow through said valve, said plug being proportioned for annular clearance in said bore in the axially aligned position of said port with said flow passages, an annular liner received in said clearance and having flow passages therethrough corresponding with those in said body, said liner including circumferentially continuous areas of substantial axial extent and circumferentially uniform cross section on both sides of said flow passages for establishing a sealing relation with corresponding circumferentially continuous areas on said plug and in said bore respectively, said liner being formed of a plastic material from the group consisting of polyethylene and its halogen substitution products characterized by high anti-frictional properties and capability of limited cold flow under pressure, cooperating means on said body and the larger end of said liner for holding said end of said liner against axial movement in said bore, means on said body extending into said clearance in interlocking relation with the smaller end of said liner beyond the adjacent said sealing area thereof to secure said smaller end of said liner against angular movement in said bore, means for exerting pressure on the larger end of said plug to maintain said liner in said sealed relation with said plug and said bore, and said liner and said body being proportioned initially with respect to the axial length of said bore and the location therein of said interlocking means to provide annular space for accommodating the entire smaller annular terminal edge of said liner and including the portion of said edge directly opposed to said interlocking means upon deformation of said liner under the operation of said pressure exerting means and in response to applied sealing pressure in use.

4. A lined plug valve comprising a valve body having flow passages and a frustoconical bore therethrough, a tapered plug received within said bore and having a port adapted to be aligned with said flow passages to control the flow through said valve, said plug being proportioned for annular clearance in said bore in the axially aligned position of said port with said flow passages, an annular liner received in said clearance and having flow passages therethrough corresponding with those in said body, said liner being formed of plastic material subject to deformation under pressure and having circumferentially continuous areas of substantial axial extent on both sides of said flow passages for establishing a sealing relation with corresponding circumferentially continuous areas on said plug and in said bore respectively, cooperating means on said body and the larger end of said liner for holding said end of said liner against both axial and angular movement in said bore, means on said body extending into said clearance in interlocking relation with the smaller end of said liner beyond the adjacent said sealing area thereof to secure said smaller end of said liner against angular movement in said bore, means for exerting pressure on the larger end of said plug to maintain said liner in said sealed relation with said plug and said bore, and said liner being proportioned axially with respect to the length of said bore and the location of said interlocking means to establish an annular space opposite the entire smaller annular terminal edge of said liner for receiving the material of said liner upon deformation thereof under the pressure of said pressure exerting means.

5. A lined plug valve comprising a valve body having flow passages and a frustoconical bore therethrough, a tapered plug received within said bore and having a port adapted to be aligned with said flow passages to control the flow through said valve, said plug being proportioned for annular clearance in said bore in the axially aligned position of said port with said flow passages, an annular liner received in said clearance and having flow passages therethrough corresponding with those in said body, said liner being formed of plastic material subject to deformation under pressure and having circumferentially continuous areas of substantial axial extent on both sides of said flow passages for establishing a sealing relation with corresponding circumferentially continuous areas on said plug and in said bore respectively, said liner being press-fitted into said bore under pressure causing cold flow thereof into sealing relation with the wall of said bore, said liner having a circumferential flange on the larger end thereof seating on said body and limiting axial movement of said end of said liner with respect to said bore, means holding said flange against angular movement with respect to said body, means on said body extending into said clearance in interlocking relation with said smaller end of said liner beyond the adjacent said sealing area thereof to secure said end of said liner against angular movement in said bore, means for exerting pressure on the larger end of said plug to maintain said liner in deformed sealing relation with said plug and said bore, and said liner and said body being proportioned initially with respect to the axial length of said bore and the location therein of said interlocking means to provide annular space for accommodating the entire smaller annular terminal edge of said liner and including the portion of said edge directly opposed to said interlocking means upon deformation of said liner under the operation of said pressure exerting means and in response to applied sealing pressure in use.

References Cited in the file of this patent

UNITED STATES PATENTS

| | | |
|---|---|---|
| 860,217 | Jackson | July 16, 1907 |
| 1,683,555 | Key | Sept. 4, 1928 |
| 1,687,646 | Duncan | Oct. 16, 1928 |
| 1,946,745 | Johnston | Feb. 13, 1934 |
| 2,102,211 | Nordstrom | Dec. 14, 1937 |
| 2,142,970 | Anderson | Jan. 3, 1939 |
| 2,204,440 | Nordstrom | June 11, 1940 |
| 2,210,335 | Mueller | Aug. 6, 1940 |
| 2,394,243 | Joyce | Feb. 5, 1946 |
| 2,424,210 | Sutton | July 15, 1947 |

FOREIGN PATENTS

| | | |
|---|---|---|
| 8,661 | Great Britain | 1901 |
| 724,177 | France | Apr. 22, 1932 |

OTHER REFERENCES

"The Chemical Age" (pages 10 to 14. Copy in January 1, 1949, Scientific Library and Div. 39), British publication.